United States Patent
Ebus et al.

(10) Patent No.: US 11,142,180 B2
(45) Date of Patent: Oct. 12, 2021

(54) METHOD FOR OPERATING A DRIVE SYSTEM, DRIVE SYSTEM, AND MOTOR VEHICLE

(71) Applicant: Volkswagen Aktiengesellschaft, Wolfsburg (DE)

(72) Inventors: Feitse Ebus, Braunschweig (DE); Lars Hentschel, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 243 days.

(21) Appl. No.: 16/450,243

(22) Filed: Jun. 24, 2019

(65) Prior Publication Data
US 2019/0308607 A1    Oct. 10, 2019

Related U.S. Application Data

(63) Continuation of application No. PCT/EP2017/082845, filed on Dec. 14, 2017.

(30) Foreign Application Priority Data

Dec. 23, 2016   (DE) ...................... 10 2016 125 607.2

(51) Int. Cl.
*B60W 20/00* (2016.01)
*B60K 6/20* (2007.10)
(Continued)

(52) U.S. Cl.
CPC .............. *B60W 20/00* (2013.01); *B60K 6/20* (2013.01); *B60K 6/485* (2013.01); *B60W 10/02* (2013.01);
(Continued)

(58) Field of Classification Search
CPC ...... B60W 20/00; B60W 10/02; B60W 20/19; B60W 20/12; B60W 20/10; B60W 10/26;
(Continued)

(56) References Cited

U.S. PATENT DOCUMENTS

| 6,691,807 B1 | 2/2004 | Bhavsar et al. |
| 6,886,524 B2 | 5/2005 | Hanada et al. |

(Continued)

FOREIGN PATENT DOCUMENTS

| DE | 10116749 A1 | 10/2001 |
| DE | 60306273 T2 | 11/2006 |

(Continued)

OTHER PUBLICATIONS

International Search Report dated Mar. 19, 2018 in corresponding application PCT/EP2017/082845.

*Primary Examiner* — Michael V Kerrigan
(74) *Attorney, Agent, or Firm* — Muncy, Geissler, Olds & Lowe, P.C.

(57) ABSTRACT

A method for operating a drive system for a motor vehicle having an internal combustion engine and having an electric motor. The internal combustion engine can be operated in a partial operating state as well as in a full operating state. A first threshold is defined for a target drive torque to be applied by the drive system for a switchover from the partial to the full operating state. After the first threshold is exceeded, a switchover is delayed for a defined period of time. A difference between the target drive torque and the actual drive torque of the internal combustion engine is compensated for by the electric motor. After the period of time has elapsed, a switchover from the partial operating state into the full operating state takes place if the first threshold value continues to be exceeded or a compensating operation of the electric motor is ended.

11 Claims, 3 Drawing Sheets

(51) Int. Cl.
*B60W 10/06* (2006.01)
*B60W 10/08* (2006.01)
*B60W 10/02* (2006.01)
*B60W 20/19* (2016.01)
*B60W 20/12* (2016.01)
*B60K 6/485* (2007.10)
*B60W 20/10* (2016.01)
*B60W 10/26* (2006.01)
*F02D 41/00* (2006.01)
*B60W 30/188* (2012.01)

(52) U.S. Cl.
CPC ............ *B60W 10/06* (2013.01); *B60W 10/08* (2013.01); *B60W 10/26* (2013.01); *B60W 20/10* (2013.01); *B60W 20/12* (2016.01); *B60W 20/19* (2016.01); *B60W 30/1882* (2013.01); *F02D 41/0087* (2013.01); *B60W 2510/0657* (2013.01); *B60W 2510/244* (2013.01); *B60W 2520/10* (2013.01); *B60W 2540/10* (2013.01); *B60W 2552/15* (2020.02); *B60W 2552/20* (2020.02); *B60W 2556/50* (2020.02); *B60W 2710/0666* (2013.01); *B60W 2710/083* (2013.01); *B60Y 2200/92* (2013.01); *Y02T 10/40* (2013.01); *Y02T 10/62* (2013.01); *Y02T 10/84* (2013.01)

(58) Field of Classification Search
CPC .. B60W 30/1882; B60W 10/06; B60W 10/08; B60W 2552/15; B60W 2552/20; B60W 2556/50; B60W 2520/10; B60W 2510/244; B60W 2540/10; B60W 2510/0657; B60W 2710/0666; B60W 2710/083; B60K 6/485; B60K 6/20; F02D 41/0087; Y02T 10/40; Y02T 10/62; Y02T 10/84; B60Y 2200/92
See application file for complete search history.

(56) References Cited

U.S. PATENT DOCUMENTS

| | | |
|---|---|---|
| 6,986,399 B2 | 1/2006 | Bhavsar et al. |
| 7,240,749 B2 | 7/2007 | Bhavsar et al. |
| 7,381,149 B2 | 6/2008 | Hartmann et al. |
| 9,073,546 B2 | 7/2015 | Kuroda et al. |
| 9,919,701 B2 | 3/2018 | Kuroda et al. |
| 2005/0003925 A1 | 1/2005 | Wakashiro et al. |
| 2005/0049108 A1 | 3/2005 | Nishizawa et al. |
| 2017/0184038 A1* | 6/2017 | Garrard .................. F02B 39/10 |

FOREIGN PATENT DOCUMENTS

| | | |
|---|---|---|
| DE | 102005033523 A1 | 1/2007 |
| DE | 112011102037 T5 | 5/2013 |

\* cited by examiner

METHOD FOR OPERATING A DRIVE SYSTEM, DRIVE SYSTEM, AND MOTOR VEHICLE

This nonprovisional application is a continuation of International Application No. PCT/EP2017/082845, which was filed on Dec. 14, 2017, and which claims priority to German Patent Application No. 10 2016 125 607.2, which was filed in Germany on Dec. 23, 2016, and which are both herein incorporated by reference.

BACKGROUND OF THE INVENTION

Field of the Invention

The present invention relates to a method for operating a hybrid drive system that includes, on the one hand, an internal combustion engine that can be operated in a full operating state as well as in a partial operating state, and on the other hand includes an electric motor that is in drive connection with the internal combustion engine. The invention additionally relates to a corresponding drive system, and to a motor vehicle having such a drive system.

Description of the Background Art

Multi-cylinder reciprocating internal combustion engines are known that can be operated temporarily in a so-called partial operating state in which certain of the combustion chambers are deactivated so that no thermodynamic cycles are carried out therein. Instead, the pistons of the deactivated combustion chambers are then carried along by the pistons of the combustion chambers that continue to be active. This takes place with the goal of an efficiency improvement for the operation of the internal combustion engines, since a deactivation of a portion of the combustion chambers with essentially constant drive power results in operation of the remaining active combustion chambers at considerably higher load, which is associated with a higher specific efficiency of the thermodynamic cycles performed in these combustion chambers. In order to attain the smallest possible decrease in the efficiency improvement achievable for the active combustion chambers as a result of carrying along the pistons of the deactivated combustion chambers, provision is normally made to keep the gas-exchange valves associated with the deactivated combustion chambers closed during partial operation, as a result of which the gas located within these combustion chambers is cyclically compressed and expanded, but is not exhausted. A power loss resulting from compression of gas volumes that would subsequently have been exhausted through opened exhaust valves can be avoided in this way.

A holding closed of the gas exchange valves of the deactivated combustion chambers can be implemented by means of a device for changing the opening stroke.

In order to achieve maximum drive convenience for a motor vehicle that is driven by an internal combustion engine that can be operated in partial operation, a switchover between the operating modes (full operating state and partial operating state) should be carried out in as torque-neutral a manner as possible, and thus without "jerking" of the drive. For this purpose, it is necessary to compensate, in as optimally matched a manner as possible, for the decreasing load with which the cylinders to be deactivated are operated during the switchover by means of an increasing load on the part of the combustion chambers that are still actively operated.

One known measure for achieving a torque-neutral switchover between the operating modes of an internal combustion engine resides in a change in the ignition timings, via which the combustion pressure in the combustion chambers, and thus the torque produced by the internal combustion engine, can be influenced. In so doing, for example in a switchover from a full operation to a partial operation, the quantity of fuel introduced into the combustion chambers is increased to approximately the quantity that, in the planned partial operation, should be introduced into the combustion chambers that are still active then, and at the same time the efficiency is intentionally decreased by a change in the ignition timing to the extent that essentially no torque increase is associated with the increase in fuel quantities prior to the switchover. For the switchover, the cylinders designated for this purpose can then be deactivated in a largely torque-neutral manner, wherein the ignition timing for the combustion chambers that will continue to be actively operated is switched back to the most optimally efficient value. It is problematic in this regard that such a temporary degradation in efficiency entails a fuel consumption by the internal combustion engine that is temporarily relatively high. The same problem is also encountered in a switchover from partial operation to full operation, because a maximally torque-neutral switchover requires that the efficiency of the combustion processes in all combustion chambers must initially be intentionally decreased after the previously deactivated combustion chambers are switched back in until the load at which the combustion chambers are operated has been reduced sufficiently to achieve a torque that is essentially equal as compared with the preceding partial operation.

DE 603 06 273 T2, which corresponds to U.S. Pat. No. 6,886,524, describes a hybrid vehicle having an internal combustion engine that can be operated in both a full and a partial operating state, and also having an electric motor in drive connection with the internal combustion engine. Provision is made to use the electric motor in support of the internal combustion engine operated in the partial operating state in order to extend the period of time for which the internal combustion engine can be operated in the partial operating state. DE 603 06 273 T2 also describes control of the internal combustion engine with regard to a switchover between the full and partial operating states in accordance with a hysteresis in order to avoid frequent switchovers in the case of slightly varying operation about a (mean) threshold provided for the switchover.

SUMMARY OF THE INVENTION

It is therefore an object of the present invention to provide an operating method for a hybrid drive system having an internal combustion engine that can also be operated in partial operation. In particular, an increased fuel consumption for such a drive system resulting from switchovers between the full and partial operating states due to intentional efficiency degradations initiated for this purpose was to be kept as low as possible.

According to an exemplary embodiment of the invention, a method is provided for operating a drive system for a motor vehicle having an internal combustion engine, in particular a gasoline engine, and having an electric motor in drive connection with the internal combustion engine. A corresponding drive system is additionally provided according to the invention. In this regard, "an electric motor in drive connection with the internal combustion engine" can be understood to mean an electric motor (or an electric machine that can at least also be operated as an electric motor) that serves directly or indirectly to produce propulsive power for the motor vehicle. A motor vehicle according to the invention includes a drive system according to the invention, wherein the drive system is intended to provide propulsive power for the motor vehicle.

An internal combustion engine that can be operated both in a full operating state and in a partial operating state is intended for use in a method according to the invention and in a drive system according to the invention. To this end, each motor can form at least a first combustion chamber and a second combustion chamber, which are delimited by cylinders formed in a cylinder housing and by pistons that are guided cyclically up and down therein, and in which thermodynamic cycles can be performed during operation of the internal combustion engine. In the full operating state, the thermodynamic cycles are performed in the (each) first combustion chamber as well as in the (each) second combustion chamber. In the partial operating state, in contrast, the (each) second combustion chamber is deactivated, wherein the thermodynamic cycles are then performed in the (each) first combustion chamber and the thermodynamic cycles are not performed in the (each) second combustion chamber.

During the thermodynamic cycles, a gas exchange in the combustion chambers can be controlled via at least one intake valve and one exhaust valve apiece, which are operated by means of a valve control device, in particular directly or indirectly by means of at least one camshaft. To achieve partial operation starting from full operation, provision can then be made that the opening stroke (i.e., the greatest valve stroke that a gas exchange valve covers during an opening cycle) of the (each) intake valve associated with the (each) second combustion chamber and/or the opening stroke of the (each) exhaust valve associated with the (each) second combustion chamber is reduced to zero. To achieve full operation starting from partial operation, in contrast, provision can be made that the opening stroke of the (each) intake valve associated with the (each) second combustion chamber and/or the opening stroke of the (each) exhaust valve associated with the (each) second combustion chamber is increased from zero to a defined value. Accordingly, the internal combustion engine of the drive system according to the invention can include an appropriate opening stroke adjusting device at least for the (each) intake valve and/or exhaust valve associated with the (each) second combustion chamber, and preferably also for the (each) intake valve and/or exhaust valve associated with the (each) first combustion chamber.

For example, at least two first combustion chambers and two second combustion chambers can be provided, so the internal combustion engine can be, for example, an at least four-cylinder internal combustion engine. Generally speaking, a design of the internal combustion engine with an even number of combustion chambers is preferred, wherein one half of the combustion chambers can then be implemented as first combustion chambers and the other half as second (deactivatable) combustion chambers. On the other hand, a design of the internal combustion engine with an odd number of combustion chambers is also possible, wherein the number of first and second (deactivatable) combustion chambers is then preferably equal to half plus or minus one.

For a switchover from the first operating state to the second operating state, a (first) threshold is defined that is at least a function of a target drive torque, and preferably directly describes a predetermined target drive torque. In this context, this threshold can also be variable, so that it can be defined differently as a function of different quantities that define the current operating state of the drive system. For example, different (first) thresholds for the target drive torque can be defined for different speeds at which the internal combustion engine can be operated in the partial operating state. The target drive torque can, in particular, be derived from the position of an accelerator pedal or the state of another input device that can be influenced by an operator of the drive system to define an acceleration or travel speed (for example, an automatic speed control device, also referred to as a "vehicle speed controller" or "cruise control").

In process terms, provision is made according to an exemplary embodiment of the invention that after the (first) threshold is exceeded, a switchover is delayed (i.e., does not take place) for a defined period of time that can be variable and can be, for example, a maximum of ten seconds, preferably a maximum of five seconds, wherein (during this delay) a difference between the target drive torque and a current actual drive torque of the internal combustion engine is compensated for (partially or preferably as completely as possible) by the electric motor, and that, after this period of time has elapsed, a switchover from the partial operating state into the full operating state takes place (only) if the (first) threshold value continues to be exceeded, wherein provision is additionally made that a compensating operation of the electric motor is ended if the torque has fallen below the (first) threshold again (i.e., only after the defined period of time has elapsed) or as soon as the torque has fallen below the (first) threshold again (i.e., possibly even before the defined period has elapsed). The actual drive torque of the internal combustion engine can be measured in this case. Preferably, however, this is determined on the basis of the operating parameters of the internal combustion engine, in particular on the basis of the drive speed, the quantity of fuel delivered to a combustion chamber for each combustion process, and, if applicable, also on the basis of the quantity of fresh gas delivered to a/this combustion chamber for each combustion process.

The drive system can include a control device that is suitably designed and, in particular, programmed, and that is in operative control connection with the components of the drive system that can be controlled for carrying out a method according to the invention.

Accordingly, provision is made according to the invention that when the target drive torque exceeds the defined (first) threshold for which a switchover from a partial operation of the internal combustion engine into a full operation is, in principle, intended, such a switchover is not at first undertaken, but rather a torque differential is briefly compensated for by the electric motor and only after, or at the latest after, the defined period of time has elapsed is a decision made as to whether the required target drive torque is above the (first) threshold for the long term or for a prolonged period so that a switchover from the partial operating state into the full operating state is also actually worthwhile. If, in contrast, the target drive torque decreases again to a value below the (first) threshold within the defined period of time, a switchover into the full operating state should not be carried out despite the exceedance of the (first) threshold that occurred beforehand. The internal combustion engine consequently remains in the partial operating state when just brief exceedance of the (first) threshold occurs, making it possible to avoid two switchovers in rapid succession within the defined, short period of time, namely first from the partial operating state into the full operating state and shortly thereafter back into the partial operating state from the full operating state. By avoiding such largely unnecessary switchovers, it is possible to avoid an associated increase each time in the specific fuel consumption as a result of an intentional, temporary reduction of efficiency.

This advantage corresponds essentially to the advantage that is achievable through control of the switchover in accordance with a hysteresis such as is described in DE 603 06 273 T2. However, an added advantage in the method according to the invention is that it is also actually possible to attain the target drive torque above the (first) threshold due to the compensation of the torque differential by means of the electric motor. Thus, for example, starting from an essentially steady-state operation of a motor vehicle according to the invention at a relatively low speed of, for example, 50 kilometers per hour, for which the drive power is provided exclusively by the internal combustion engine operated in the partial operating state with a relatively small load, it is possible to achieve a relatively small increase in the required driving speed, for example to 55 or 60 kilometers per hour, with adequate acceleration without the need for a brief switchover from the partial operating state into the full operating state that would be reversed as soon as the increased driving speed that is required has been reached. The additional drive torque needed to increase the driving speed with sufficient acceleration, which cannot be provided by the internal combustion engine in partial operation, is provided according to the invention in this case by the electric motor.

A switchover can be delayed only if, or only as long as, the target drive torque that exceeds the first threshold is below a second threshold, which can also be variable. By this means it is possible, in particular, to achieve the result that a switchover from the partial operating state into the full operating state is only delayed when the electric motor is also in fact able to compensate for the difference between the target drive torque and the actual drive torque of the internal combustion engine over an adequately long period of time. In contrast, if a target drive torque that goes beyond this (i.e., that is above the second threshold) is required, then a switchover from the partial operating state into the full operating state of the internal combustion engine can be carried out, preferably immediately, in order to be able to immediately provide an adequate drive power of the drive system. Naturally, this does not preclude that the electric motor likewise provides an additional drive torque in this case The first threshold and/or the second threshold and/or the defined period of time can be variably chosen as a function of a current and/or a future (i.e., predicted for the (near) future) operating state of the drive system that corresponds to a current or future driving condition of the motor vehicle. Data, in particular from a navigation system and/or from a traffic sign recognition system and/or from a system for detecting driving operation on an uphill or downhill grade and/or from a system for detecting a current weight of the motor vehicle (including trailer if applicable), can be analyzed for this purpose. For example, if such a navigation system and/or such a traffic sign recognition system signals a speed limit (e.g., 50 km/h) and a driving speed in the vicinity of the maximum permissible speed, it can be assumed from this with relatively high probability that an exceedance of the first threshold for the target drive torque will not result in a relatively large speed increase that can then be rationally achieved by supporting the internal combustion engine operated in the partial operating state by means of the electric motor. In similar fashion, a required speed increase during travel on a downhill grade can likewise be achieved relatively easily by means of support by the electric motor without requiring a switchover of the internal combustion engine from the partial operating state into the full operating state. On the other hand, a detected departure from a speed-limited area (e.g., when leaving the city limits), a detected travel on an uphill grade, and/or a detected relatively high total weight of the vehicle can provide an expectation of a more power-intensive speed increase, so that a switchover for the internal combustion engine into a full operating state can then be carried out relatively soon, and in particularly as soon as possible.

The first threshold and/or the second threshold and/or the defined period of time for which a switchover from the partial operating state into the full operating state can be delayed, is variably chosen as a function of the charge state of an electrical energy storage device associated with the electric motor. As a result, the degree to which the electric motor is able to compensate for a torque differential in the first place based on a potentially adequate supply of electrical energy is advantageously taken into account. In this context, for example, provision can be made that for a relatively high charge state the second threshold and/or the defined period of time can be chosen to be relatively high or relatively long because the electric motor is fundamentally able to support the internal combustion engine operated in the partial operating state with a relatively high drive torque and/or over a relatively long period of time on account of a relatively good supply of electrical energy.

The actual drive torque produced by the internal combustion engine can be increased during the delay of the switchover, at least under certain circumstances. Firstly, it is possible in this way for an adequately high drive torque to be made available by the internal combustion engine as quickly as possible when a switchover from the partial operating state into the full operating state takes place after the defined period of time has elapsed (because the target drive torque is still above the (first) threshold). On the other hand, it is possible in this way for the internal combustion engine to provide a drive power that is increased as compared to the operation when the (first) threshold was exceeded, immediately after the end of compensating operation of the electric motor (because the target drive torque is again below the (first) threshold no later than when the defined period of time has elapsed). This can be advantageous, for example, when the target drive torque has briefly exceeded the (first) threshold because a slight increase in the driving speed of a motor vehicle according to the invention was intended, and such an increase has also taken place.

The method according to the invention is especially advantageously suitable for use in a drive system in which the electric motor is intended exclusively for supporting generation of a drive torque (and in particular is also designed for this purpose to be appropriately limited with regard to its power). Accordingly, the electric motor of such a drive system according to the invention is not designed to exclusively generate the drive power that is to be provided by the drive system for a period of time, and consequently without support from the internal combustion engine. In such a drive system or in a motor vehicle that includes such a drive system, also frequently referred to by the term "mild hybrid," partial operation can be used especially advantageously to achieve the highest possible efficiency, because the internal combustion engine in such a drive system fundamentally must always be operated when drive torque is to be provided, and in this design can frequently (because of the support by the electric motor) be operated in the partial operating state, which is advantageous with regard to efficiency but disadvantageous with regard to power development, without adversely affecting power development by the drive system as a whole. In contrast, in a drive system that combines an internal combustion engine with an electric motor that is also suitable for providing adequate drive torque for at least certain operating conditions of the drive system by itself, which is to say without support from the internal combustion engine (frequently also called a "full hybrid"), non-operation of the internal combustion engine can also advantageously be provided in those operating conditions where partial operation of the internal combustion engine would be provided in a "mild hybrid." For this reason, the internal combustion engine of a drive system designed as a "full hybrid" can advantageously be designed without the option of operating in a partial operating state, because its design complexity can be kept relatively low in this way. Regardless, it is also possible, however, to design a drive system implemented as a "full hybrid" in accordance with the invention and to operate it in accordance with a method according to the invention.

A control device with a memory is also provided, wherein a computer program is stored in the memory, the execution whereof makes it possible to carry out a method according to the invention.

The invention additionally relates to a computer program with a program code for carrying out a method according to the invention when the computer program is executed on a computer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
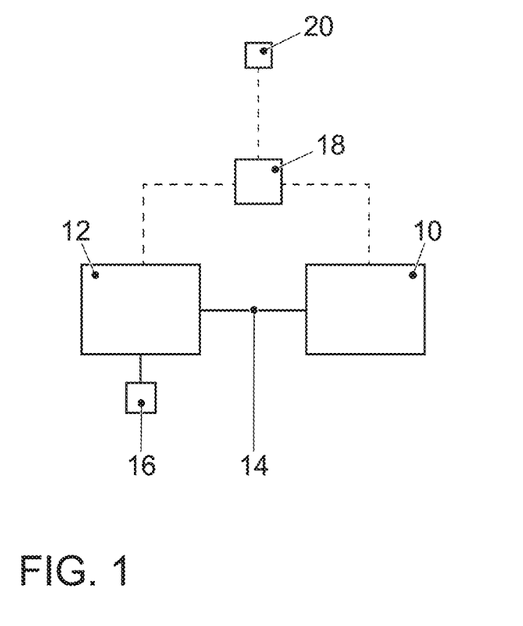
FIG. 1 illustrates a drive system according to the invention in a schematic representation.

FIG. 1 shows, in schematic representation, a hybrid drive system according to the invention for a motor vehicle (hybrid vehicle). This vehicle includes an internal combustion engine 10 and an electric motor 12 in drive connection with the internal combustion engine 10. A drive power, which has been produced by the electric motor 12 and/or by the internal combustion engine 10, is transmitted to wheels of one or more driven axles of the motor vehicle. A coupling of the electric motor 12 and of the internal combustion engine 10 (with regard to the drive action for the motor vehicle), which is shown schematically in FIG. 1 on the basis of a shaft 14, can be realized in various ways. For example, provision can be made that the electric motor 12 acts on an output shaft (crankshaft) of the internal combustion engine 10 directly or with the interposition of a transmission.

The electric motor 12 is connected in an electrically conductive manner to an electrical energy storage device 16, for example to a battery, by which the electric motor 12 can be supplied with electrical energy when it is to be operated as a motor. At the same time, it is also possible to operate the electric motor 12 as a generator, via which electrical energy is produced that can be stored in the energy storage device 16.

Both the electric motor 12 and the internal combustion engine 10 can be controlled by means of a control device 18 (engine control unit). In this case, control is accomplished, in particular, as a function of the position of an accelerator pedal 20 that can be operated by a driver of the motor vehicle.

Figure 2:
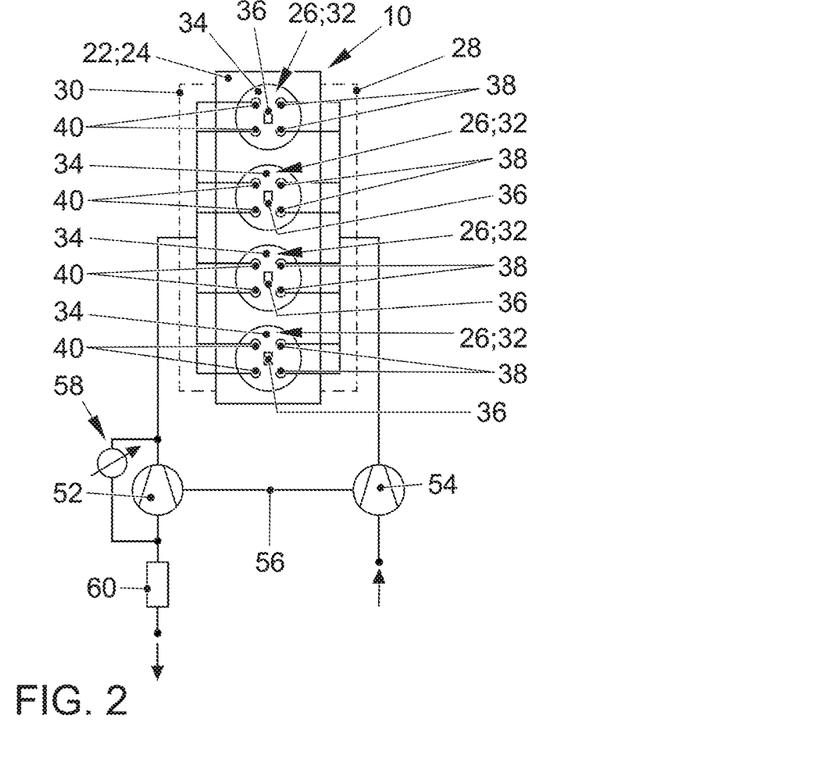
FIG. 2 illustrates an internal combustion engine for a drive system according to the invention from FIG. 1 in a top view.
Figure 3:
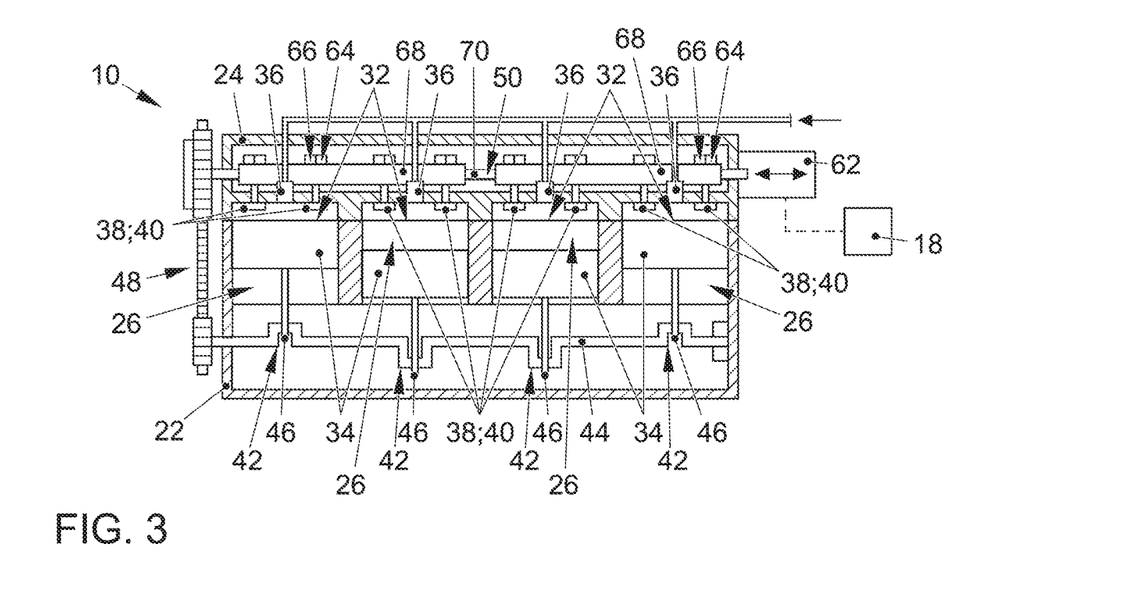
FIG. 3 illustrates the internal combustion engine from FIG. 2 in a longitudinal section.

FIGS. 2 and 3 schematically show an internal combustion engine 10 for a drive system according to the invention, for example for a drive system in accordance with FIG. 1. The internal combustion engine 10 can, in particular, be operated with a four-stroke cycle and be designed appropriately for that purpose.

The internal combustion engine 10 forms several (for example, four) cylinders 26 in a unit formed of a cylinder housing 22 and cylinder head 24. The cylinders 26 are connected in a gas-carrying manner on the intake side to an intake manifold 28 of an intake system and on the exhaust side to an exhaust manifold 30 of an exhaust system of the internal combustion engine 10. In a known manner, fresh gas (essentially air) is burned with fuel in combustion chambers 32 that are delimited by the cylinders 26 together with pistons 34 guided therein and with the cylinder head 24. The fuel can be injected directly into the combustion chambers 32 for this purpose by means of injectors 36. The exhaust gas produced in the combustion of the fuel/fresh gas mixtures is carried away through the exhaust system.

Figure 4:
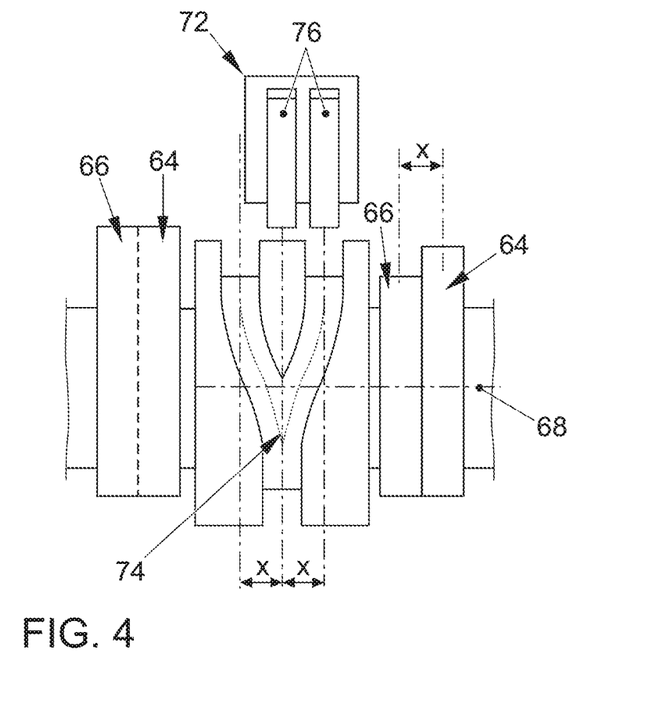
FIG. 4 illustrates a portion of a cam carrier of the internal combustion engine from FIGS. 2 and 3, and also an associated switchover actuator.

The delivery of fresh gas into the combustion chambers 32 and the removal of the exhaust gas from the combustion chambers 32 is controlled by means of gas exchange valves, in the present case by means of two intake valves 38 and two exhaust valves 40 per cylinder 26, which are actuated by a valve actuating mechanism of the internal combustion engine 10 that is not shown in FIG. 2, is shown only partially in FIG. 3, and is shown in additional detail in FIG. 4.

The valve actuating mechanism according to FIG. 3 includes a crankshaft 44 forming crankshaft journals 42, wherein the crankshaft journals 42 are connected to the pistons 34 by connecting rods 46. In this way, linear motions of the pistons 34 are converted into a rotation of the crankshaft 44, wherein the rotation of the crankshaft 44 in turn causes a periodic reversal of direction of the linear motions of the pistons 34. The rotation of the crankshaft 44 is also transmitted through a control mechanism, for example a toothed belt drive 48, to two camshafts 50, each of which operates two gas exchange valves 38, 40 per combustion chamber 32. One of the camshafts 50 is implemented as an intake camshaft, i.e., it operates (indirectly) all intake valves 38, while the other is implemented as an exhaust camshaft, and consequently operates (indirectly) all exhaust valves 40.

The internal combustion engine 10 additionally includes an exhaust gas turbocharger (see also FIG. 1). This includes a turbine 52 integrated into the exhaust system and a compressor 54 integrated into the intake system. A rotor of the turbine 52 driven in rotation by the exhaust gas stream drives a rotor of the compressor 54 through a shaft 56. The rotation of the rotor of the compressor 54 thus brought about compresses the fresh gas routed through it. Boost pressure limitation can be accomplished by means of a wastegate 58 by routing a portion of the exhaust gas stream around the turbine 52 in operation of the internal combustion engine 10 at high speeds and/or loads. In addition, an exhaust gas treatment device 60, for example in the form of a three-way catalytic converter, is integrated into the exhaust system.

Moreover, the internal combustion engine 10 also includes a switchover device 62, by means of which it is possible to switch from an operation by means of a first cam 64 to operation by means of a second cam 66 for the intake valves 38 as well as the exhaust valves 40. This switchover device 62 can be controlled by a control device 18, and is indicated only schematically in FIG. 3. The function of the switchover device 62 is based on a movability along a longitudinal axis of sleeve-like cam carriers 68 (see also FIG. 4), which are arranged in a rotationally fixed manner on a base shaft 70, by means of a switchover actuator 72 (see also FIG. 4) for each carrier, wherein the cam carriers 68 have two different cams 64, 66 for each of the intake valves 38 and exhaust valves 40 that they can operate (see also FIG. 4), which cams interact alternately, as a function of the movement positions of the cam carriers 68 that have been set, with the associated intake valves 38 and exhaust valves 40.

In the exemplary embodiment as is shown in FIGS. 3 and 4, each of the cam carriers 68 includes a total of four cam pairs, each of which is associated with a gas exchange valve 38, 40 of the internal combustion engine. Thus, either the intake valves 38 or the exhaust valves 40 of a total of two adjacent combustion chambers 32 of the internal combustion engine 10, in which two intake valves 38 and two exhaust valves 40 are associated with each combustion chamber 32, are operated by means of the cams 64, 66, which are formed by a cam carrier 68 of this type. Moreover, the cam carrier 68 according to FIG. 4 also forms a shift gate in the form of a Y-shaped guide slot 74 between the two cam pairs associated with the gas exchange valves 38, 40 of a first combustion chamber 32 and the two cam pairs associated with the gas exchange valves 38, 40 of a second combustion chamber 32. By means of an interaction of this guide slot 74 with drivers 76 of the associated switchover actuator 72, the cam carrier 68 can be moved axially by the distance x, and thus a selected cam 64, 66 of each cam pair can be brought into operative connection with the associated gas exchange valve 38, 40 in each case. For this purpose, starting for example from the functional setting shown in FIG. 4, in which each of the gas exchange valves 38, 40 stands in operative connection with the right (first) cam 64 of each cam pair, the right driver 76 can be extended, thus moving the cam carrier 68 to the right by the distance x in interaction with its rotation (upward in FIG. 4). As a result of the running out of the Y-shaped guide slot 74 into the central section, at the bottom in FIG. 4, the right driver 76 is moved back into the retracted position in this process. After such a movement of the cam carrier 68 by the distance x, each of the left (second) cams 66 of each cam pair is then in operative connection with the associated gas exchange valve 38, 40. Such a movement of the cam carrier 68 to the right by the distance x also has the result that the left driver 76 has been brought into alignment with the left section of the Y-shaped guide slot 74, so that by extending this driver 76, the cam carrier 68 can again be moved left by the distance x.

Provision is made that for a so-called partial operation of the internal combustion engine 10, a portion, and in particular half, of the combustion chambers 32, specifically the two middle combustion chambers 32, can be deactivated in that the supply of fuel to the associated injectors 36 is stopped and the gas exchange valves 38, 40 associated therewith are no longer operated or are operated with zero stroke. For this purpose, provision is made that each cam pair that is associated with the gas exchange valves 38, 40 of such a deactivatable combustion chamber 32 (see the cam pair shown on the right in FIG. 4) forms a second cam 66 in the form of a so-called null cam that has no cam lift and thus causes no opening of a gas exchange valve 38, 40 associated therewith.

In the case of a switchover of the internal combustion engine 10 from a full operating state, in which all of the combustion chambers 32 are operated, preferably with low to medium loads, into such a partial operating state, half of the combustion chambers 32 are deactivated in a very short period of time that corresponds approximately to one rotation of the crankshaft 44, and thus can no longer contribute to generation of a drive torque by the internal combustion engine 10. On the contrary, since the pistons 34 associated with these combustion chambers 32 must be carried along by the pistons 34 that are still actively moved, the pistons 34 associated with the deactivated combustion chambers 32 change their function from that of a power producer to a power consumer.

Since such a switchover from full operation to partial operation is intended to take place regularly in a constant operating phase of the internal combustion engine 10, the drive power before and after the switchover should also remain essentially constant. Consequently, the loss of the pistons 34 of the deactivated combustion chambers 32 as power producers must be compensated for by the combustion chambers 32 that continue to be actively operated. The load at which these are operated after a switchover must be considerably increased for this purpose, and in particular approximately doubled. To this end, a considerably larger quantity of fuel must be converted, for which a quantity of fresh gas that is increased approximately commensurately is required. The increased quantity of fresh gas can be achieved by increasing the pressure in the intake manifold 28 through conventional measures of boost pressure regulation of the exhaust gas turbocharger. As a result of a higher compression of the fresh gas, more fresh gas can then be introduced into the combustion chambers 32 so that a correspondingly increased quantity of fuel can be converted.

To achieve a maximally torque-neutral switchover between the operating modes, the measures for achieving the drive torque to be produced by the active combustion chambers 32 after the switchover must be initiated sufficiently early before the switchover. For example, for a switchover from a full operating state into a partial operating state, it is thus necessary for increased quantities of fresh gas and fuel to be introduced into the combustion chambers 32 even before the stopping via the switchover device 62 of the gas exchange valves 38, 40 associated with the combustion chambers 32 that are to be deactivated, so that the required drive torque can be provided by the combustion chambers 32 that continue to be active immediately after the switchover into partial operation. In order to avoid an increase in the drive torque before the switchover caused by the increased quantities of fresh gas/fuel mixture in the combustion chambers 32, provision can be made to shift the ignition timings for the combustion chambers 32 so as to result in an efficiency for the thermodynamic cycles taking place therein that is deliberately bad enough that no relevant increase in drive torque occurs despite an increased use of fuel. However, such a measure has the result that a switchover between the operating modes is temporarily associated with a relatively high fuel consumption, which should be avoided if possible.

This is accomplished in accordance with the invention in that multiple switchovers between the operating modes taking place in rapid succession due to a requirement for a target drive torque that is close to a threshold provided for such a switchover and that briefly exceeds and falls below this threshold are avoided if possible. To this end, provision is made that after a first threshold for the target drive torque is exceeded (if this does not also exceed a second threshold), a switchover is delayed for a defined period of time, wherein during this delay a difference between the target drive torque and a current actual drive torque that the internal combustion engine 10 provides is compensated for as completely as possible by the electric motor 12. If the required target drive torque continues to exceed the first threshold after this period of time has elapsed, a switchover from the partial operating state into the full operating state is performed by means of the control device 18. If this is not the case, a corresponding switchover does not take place. Furthermore, provision is made that the operation of the electric motor 12 compensating for the torque differential is ended no later than at that time (which is to say after the said period of time has elapsed), so that the full drive power of the drive system is then once again produced exclusively by the internal combustion engine 10, which continues to be operated in the partial operating state.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for operating a drive system for a motor vehicle having an internal combustion engine and having an electric motor in drive connection with the internal combustion engine, wherein the internal combustion engine is operable in a partial operating state as well as in a full operating state, the method comprising:
    defining a first threshold for a target drive torque to be applied by the drive system for a switchover from the partial operating state into the full operating state;
    delaying a switchover, after the target drive torque exceeds the first threshold, for a defined period of time during which a difference between the target drive torque and an actual drive torque of the internal combustion engine is compensated by the electric motor; and
    switching-over, after the period of time has elapsed, from the partial operating state to the full operating state if the first threshold continues to be exceeded or ending a compensating operation of the electric motor if the target drive torque has fallen below the first threshold after the period of time has elapsed or as soon as the target drive torque falls below the first threshold during the period of time.

2. The method according to claim 1, wherein the defined period of time is a maximum of 10 seconds.

3. The method according to claim 1, wherein the switching-over is delayed only if, or only as long as, the target drive torque that exceeds the first threshold is below a second threshold.

4. The method according to claim 3, wherein the second threshold is variably chosen as a function of a current and/or future operating state of the drive system that corresponds to a current or future driving condition of the motor vehicle.

5. The method according to claim 3, wherein the second threshold is variably chosen as a function of a charge state of an electrical energy storage device associated with the electric motor.

6. The method according to claim 1, wherein the actual drive torque produced by the internal combustion engine is increased during the delay of the switchover.

7. The method according to claim 1, wherein the electric motor only generates a supportive drive torque for the internal combustion engine.

8. The method according to claim 1, wherein the first threshold and/or the defined period of time is variably chosen as a function of a current and/or future operating state of the drive system that corresponds to a current or future driving condition of the motor vehicle.

9. The method according to claim 1, wherein the first threshold and/or the defined period of time is variably chosen as a function of a charge state of an electrical energy storage device associated with the electric motor.

10. A drive system comprising:
    an internal combustion engine operable in a partial operating state as well as in a full operating state; and
    an electric motor in drive connection with the internal combustion engine, a control device configured to perform the method of operating the drive system for a motor vehicle having the internal combustion engine and having the electric motor in drive connection with the internal combustion engine, wherein the internal combustion engine is operable in the partial operating state as well as in the full operating state, the method comprising:
    defining a first threshold for a target drive torque to be applied by the drive system for a switchover from the partial operating state into the full operating state;
    delaying a switchover, after the target drive torque exceeds the first threshold, for a defined period of time during which a difference between the target drive torque and an actual drive torque of the internal combustion engine is compensated by the electric motor; and
    switching-over, after the period of time has elapsed, from the partial operating state to the full operating state if the first threshold continues to be exceeded or ending a compensating operation of the electric motor if the target drive torque has fallen below the first threshold after the period of time has elapsed or as soon as the target drive torque falls below the first threshold during the period of time.

11. A motor vehicle comprising:
    a drive system, the drive system comprising:
        an internal combustion engine operable in a partial operating state as well as in a full operating state; and
        a electric motor in drive connection with the internal combustion engine,
        a control device configured to perform the method of operating the drive system for the motor vehicle having the internal combustion engine and having the electric motor in drive connection with the internal combustion engine, wherein the internal combustion engine is operable in the partial operating state as well as in the full operating state, the method comprising:

defining a first threshold for a target drive torque to be applied by the drive system for a switchover from the partial operating state into the full operating state;

delaying a switchover, after the target drive torque exceeds the first threshold, for a defined period of time during which a difference between the target drive torque and an actual drive torque of the internal combustion engine is compensated by the electric motor; and switching-over, after the period of time has elapsed, from the partial operating state to the full operating state if the first threshold continues to be exceeded or ending a compensating operation of the electric motor if the target drive torque has fallen below the first threshold after the period of time has elapsed or as soon as the target drive torque falls below the first threshold during the period of time.

* * * * *